United States Patent
Uno et al.

(10) Patent No.: US 9,511,936 B2
(45) Date of Patent: Dec. 6, 2016

(54) IMAGE READING APPARATUS

(71) Applicant: BROTHER KOGYO KABUSHIKI KAISHA, Nagoya-shi, Aichi-ken (JP)

(72) Inventors: Mayu Uno, Nagoya (JP); Daisuke Nakayama, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 37 days.

(21) Appl. No.: 14/471,779

(22) Filed: Aug. 28, 2014

(65) Prior Publication Data
US 2015/0060239 A1 Mar. 5, 2015

(30) Foreign Application Priority Data
Aug. 30, 2013 (JP) ................... 2013-178988

(51) Int. Cl.
*B65G 13/02* (2006.01)
*B65G 13/00* (2006.01)
*H04N 1/00* (2006.01)
*H04N 1/12* (2006.01)

(52) U.S. Cl.
CPC .......... *B65G 13/02* (2013.01); *H04N 1/00602* (2013.01); *H04N 1/121* (2013.01)

(58) Field of Classification Search
None
See application file for complete search history.

(56) References Cited

U.S. PATENT DOCUMENTS

2005/0281598 A1* 12/2005 Hattori ............... G03G 15/6573
399/405
2008/0285097 A1 11/2008 Kitagawa et al.

FOREIGN PATENT DOCUMENTS

JP 2008-285259 A 11/2008

OTHER PUBLICATIONS

User Manual of imageFORMULA P-215.
Document to disclose imageFORMULA P-215.

* cited by examiner

*Primary Examiner* — Kavel Singh
(74) *Attorney, Agent, or Firm* — Scully, Scott, Murphy & Presser, P.C.

(57) ABSTRACT

An image reading apparatus includes a guide portion, a reader, a first drive roller and a second drive roller, and a first driven roller and a second driven roller. A first protrusion is formed in the reader and may be disposed on one side of the first drive roller. A second protrusion is formed in the reader and may be disposed on one side of the second drive roller. The second protrusion may protrude upward more than the first protrusion.

15 Claims, 9 Drawing Sheets

IMAGE READING APPARATUS

CROSS-REFERENCE TO RELATED APPLICATION

This application claims priority from Japanese Patent Application No. 2013-178988 filed on Aug. 30, 2013, the content of which is incorporated herein by reference in its entirety.

FIELD

Aspects described herein relate to an image reading apparatus.

BACKGROUND

A known image reading apparatus includes a guide portion, a conveyance portion, and a reader. The guide portion defines a conveyance path having a sheet conveyance area in which a sheet original is conveyed. The sheet conveyance area includes a first area and a second area. The first area extends in a conveying direction. The second area also extends in the conveying direction and is adjacent to the first area from one side in a width direction orthogonal to the conveying direction. Specifically, a card conveyance area, in which a card original is conveyed, is equivalent to the second area. The first area is the remainder of the sheet conveyance area.

The conveyance portion includes a first drive roller, a second drive roller, a first driven roller, and a second driven roller. The first drive roller and second drive roller are disposed upstream of the reader in the conveying direction and on one side in a height direction orthogonal to the width direction and conveying direction. The first drive roller and second drive roller have the same diameter and are rotated about a drive axis extending in the width direction. The first driven roller and second driven roller are disposed on another side in the height direction of the conveyance path. The first drive roller and first driven roller are disposed in the first area so as to come into contact with each other. The second drive roller and second driven roller are disposed in the second area with a space left therebetween. The reader includes a lower reader disposed on one side in the height direction with respect to the conveyance path, and also has an upper reader disposed on another side in the height direction with respect to the conveyance path.

In this image reading apparatus, the conveyance portion conveys a medium, which is guided by the guide portion, in the conveying direction. The upper reader and lower reader read an image on the medium guided by the guide portion. During the reading of an image, the second drive roller and second driven roller hold a narrow-width medium, which is guided by the guide portion in the second area, to convey the medium in the conveying direction. However, the second drive roller and the second driven roller do not hold a wide-width medium, which is guided by the guide portion in the first area and second area because there is a space in the height direction therebetween.

BRIEF SUMMARY

According to an aspect of the disclosure, an image reading apparatus is configured to read a media. The image reading apparatus comprises a guide portion, a reader, and a conveying portion. The guide portion comprises a first portion that is inclined and a second portion. The guide portion defines a conveyance path. The conveyance path has a first area and a second area. The first area extends in a conveyance direction. The second area extends in the conveyance direction and is adjacent to the first area on a first side in a width direction perpendicular to the conveyance direction. The second portion is disposed downstream of the first portion in the conveyance direction. The reader is configured to read an image of the media guided by the guide portion. The reader is disposed on a first side in a height direction with respect to the conveyance path. The height direction is perpendicular to both the conveyance direction and the width direction. The conveying portion is provided in the second portion of the guide portion and is configured to convey the media guided by the guide portion in the conveyance direction. The conveying portion comprises a first drive roller, a second drive, a first driven roller, a second driven roller, a first protrusion and a second protrusion. The first drive roller is mounted on the first side in the height direction with respect to the conveyance path. The first drive roller is disposed upstream of the reader in the conveyance direction and disposed in the first area. The first drive roller is configured to rotate about a drive axis extending in the width direction. The second drive roller is mounted on the first side in the height direction with respect to the conveyance path. The second drive roller is disposed upstream of the reader in the conveyance direction and is disposed in the second area. The second drive roller is configured to rotate about the drive axis. The first driven roller is mounted on a second side in the height direction with respect to the conveyance path and is disposed in the first area. The first driven roller contacts the first drive roller. The second driven roller is mounted on a second side in the height direction with respect to the conveyance path and is disposed in the second area. An outer surface of the second driven roller facing the second drive roller spaced apart from an outer surface of the second drive roller facing the second driven roller. The first protrusion is formed in the reader and is disposed in the first area on at least one side or another side of the first drive roller in the width direction. The first protrusion protrudes toward upstream in the conveyance direction. The first protrusion comprises a first surface facing the second side in the height direction. The second protrusion is formed in the reader and is disposed in the second area on at least one side or another side of the second drive roller in the width direction. The second protrusion protrudes toward upstream in the conveyance direction. The second protrusion comprises a second surface facing the second side in the height direction. The second surface protrudes toward the second side in the height direction more than the first surface of the first protrusion.

According to another aspect of the disclosure, an image reading apparatus is configured to read a media. The image reading apparatus comprises a first housing, a second housing, a reader, a first drive roller, a second drive, a first driven roller, a second driven roller, a first protrusion and a second protrusion. The first housing comprises a first surface. The first surface comprises a first portion that is inclined and a second portion. The second housing is configured to support the first housing movably between an open position and a close position. The second housing comprises a second surface facing and spaced apart from the first surface when the first housing is in the close position. The second surface comprises a third portion that is inclined and a fourth portion. The first and second surfaces define a conveyance path therebetween. The conveyance path has a first area and a second area. The first area extends in a conveyance direction. The second area extends in the conveyance direction and is adjacent to the first area on a first side in a width direction perpendicular to the conveyance direction. The second portion is disposed downstream of the first portion in the conveyance direction. The fourth portion is disposed downstream of the third portion in the conveyance direction. The reader is configured to read an image of the media in the conveyance path. The reader is disposed in the second housing. The first drive roller is disposed in the fourth portion of the second surface of the second housing. The first drive roller is disposed in upstream of the reader in the conveyance direction and is exposed to the first area of the conveyance path. The first drive roller is configured to rotate about a drive axis extending in the width direction. The second drive roller is disposed in the fourth portion of the second surface of the second housing. The second drive roller is disposed in upstream of the reader in the conveyance direction and is exposed to the second area of the conveyance path. The second drive roller is configured to rotate about the drive axis. The first driven roller is disposed in the second portion of the first surface of the first housing and is exposed to the first area of the conveyance path. The first driven roller contacts to the first drive roller when the first housing is in the close position. The second driven roller is disposed in the second portion of the first surface of the first housing and is exposed to the second area of the conveyance path. An outer surface of the second driven roller facing the second drive roller is spaced apart from an outer surface of the second drive roller facing the second driven roller when the first housing is in the close position. The first protrusion is disposed in the first area on at least one side or another side of the first drive roller in the width direction. The first protrusion comprises a third surface facing the first surface of the first housing when the first housing is in the close position. The second protrusion is disposed in the second area on at least one side or another side of the second drive roller in the width direction. The second protrusion comprises a fourth surface facing the first surface of the first housing when the first housing is in the close position. The fourth surface is closer to the first surface of the first housing than the third surface of the first protrusion.

According to yet another aspect of the disclosure, an image reading apparatus is configured to read a media. The image reading apparatus comprise a guide portion, a reader, and a conveying portion. The guide portion comprises a first portion that is inclined and a second portion. The guide portion defines a conveyance path. The conveyance path has a left area and a right area. The left area extends in a conveyance direction. The right area extends in the conveyance direction and is adjacent to the left area in a width direction perpendicular to the conveyance direction. The second portion is disposed downstream of the first portion in the conveyance direction. The reader is configured to read an image of the media guided by the guide portion. The reader is disposed below the conveyance path in a height direction perpendicular to both the conveyance direction and the width direction. The conveying portion is provided in the second portion of the guide portion and is configured to convey the media guided by the guide portion in the conveyance direction. The conveying portion comprises a left drive roller, a right drive roller, a left driven roller, a right driven roller, a first protrusion, and a second protrusion. The left drive roller is mounted below the conveyance path in the height direction. The left drive roller is disposed upstream of the reader in the conveyance direction. The left drive roller is disposed in the left area. The left drive roller is configured to rotate about a drive axis extending in the width direction. The right drive roller is mounted below the conveyance path in the height direction. The right drive roller is disposed upstream of the reader in the conveyance direction. The right drive roller is disposed in the right area. The right drive roller is configured to rotate about the drive axis. The left driven roller is mounted above the conveyance path in the height direction. The left driven roller is disposed in the left area. The left driven roller contacts the left drive roller in the height direction. The right driven roller is mounted above the conveyance path in the height direction. The right driven roller is disposed in the right area. An outer surface of the right driven roller facing the right drive roller is spaced apart from an outer surface of the right drive roller facing the right driven roller. The first protrusion is disposed in the left area on at least one side or another side of the left drive roller in the width direction. The first protrusion comprises a first surface facing upward in the height direction. The second protrusion is disposed in the right area on at least one side or another side of the right drive roller in the width direction. The second protrusion comprises a second surface facing upward in the height direction. The second surface protrudes toward upward in the height direction more than the first surface of the first protrusion.

BRIEF DESCRIPTION OF THE DRAWINGS

For a more complete understanding of the disclosure, and the objects, features, and advantages thereof, reference now is made to the following descriptions taken in connection with the accompanying drawing.

DETAILED DESCRIPTION

With the known image reading apparatus, there is a space between the second drive roller and the second driven roller. When a wide-width medium is guided by the guide portion in the first area and second area, therefore, the front end of the medium in the width direction on the same side as the second area is likely to hang down in the second area. Then, the hanging-down front end of the medium may be caught by a portion of the lower reader facing the second driven roller from the downstream side in the conveying direction. If this happens, the medium is likely to be skewed or cause a jam, preventing the medium from being stably conveyed.

An aspect of the disclosure relates to an image reading apparatus configured to distinguishably detect a medium inserted through a first introduction opening and a medium inserted through a second introduction opening. An aspect of the disclosure relates to an image reading apparatus configured to stably convey a medium guided by the guide portion in the first area and second area.

A first embodiment and a second embodiment of the present disclosure will be described below with reference to the accompanying drawings.

Figure 1:
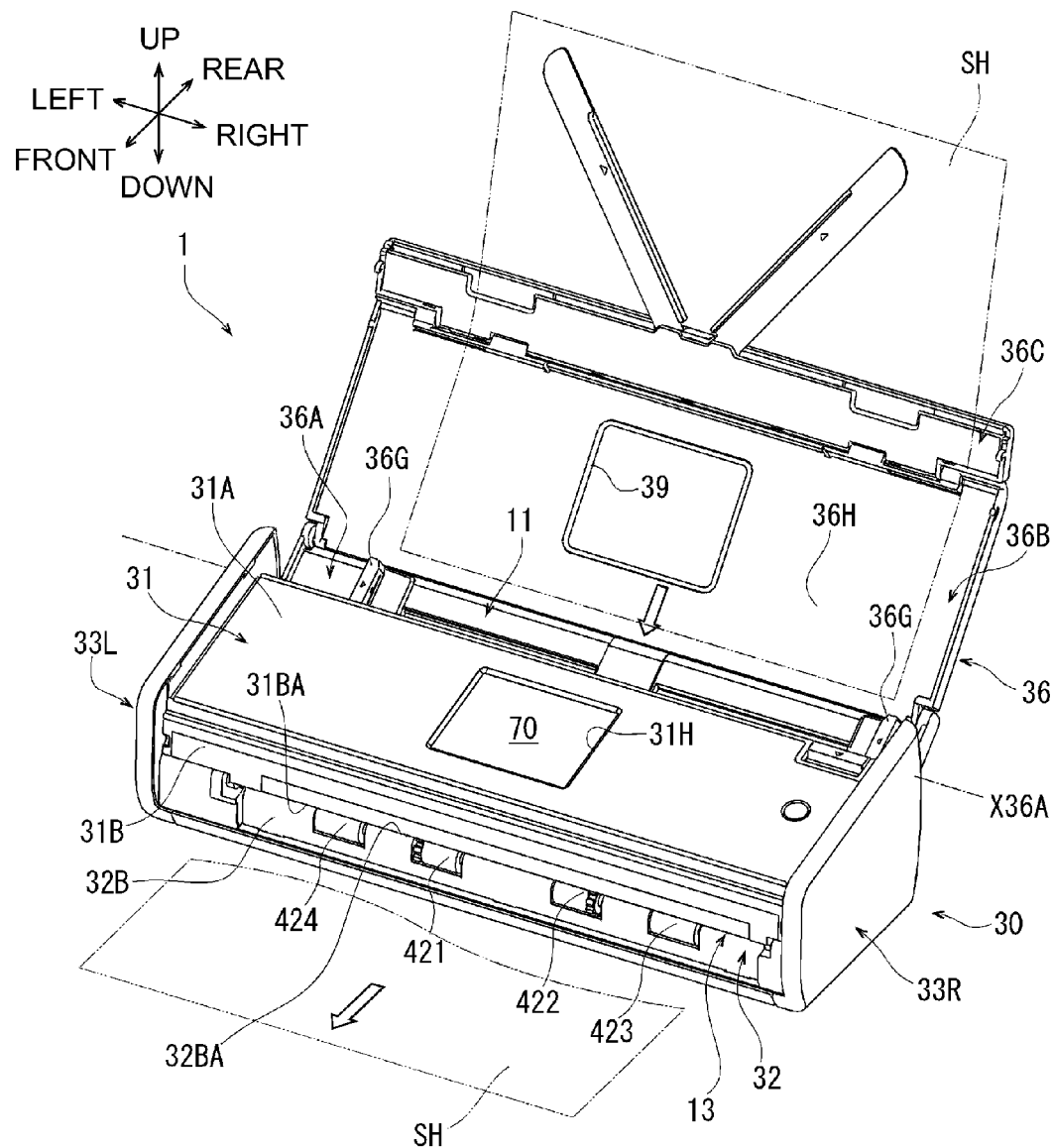
FIG. 1 is a front perspective view of an image reading apparatus, in an example embodiment according to one or more aspects of the disclosure, in which a tray is in an open position.

In FIG. 1, the front side of an image reading apparatus 1 may be defined as a side on which a discharge opening 13 may be disposed. The left side of the image reading apparatus 1 may be defined as a side that is placed on the left when viewed from a side facing the discharge opening 13. The front-rear directions, left-right directions, and up-down directions of the image reading apparatus 1 are indicated with respect the front side and left side. The directions in FIG. 2 and later drawings are indicated to match the directions in FIG. 1. Elements constituting the image reading apparatus 1 will be described below with reference to FIG. 1 and other drawings. To facilitate an understanding of positional relationships and directional relationships among various elements disclosed herein, the upper side, lower side, front side, back side, right side, and left side of the image reading apparatus 1 will be described with reference to the axes of a three-dimensional Cartesian coordinate system included in each of the relevant drawings.

As illustrated in FIGS. 1 to 6, the image reading apparatus 1 may comprise a housing 30 and a tray 36. The housing 30 may comprise a first housing 31 and a second housing 32. The first housing 31 is disposed above the second housing 32. The first housing 31 and second housing 32 face each other with a vertical space left therebetween. The second housing 32 may comprise a first side wall 33R and a second side wall 33L. The first side wall 33R and second side wall 33L may be apart from each other in the left-right direction. The first side wall 33R may be the right surface of the second housing 32. The second side wall 33L may be the left surface of the second housing 32. The upper side of the first side wall 33R may be located at the right end of the first housing 31. The upper side of the second side wall 33L may be located at the left end of the first housing 31.

Figure 5:
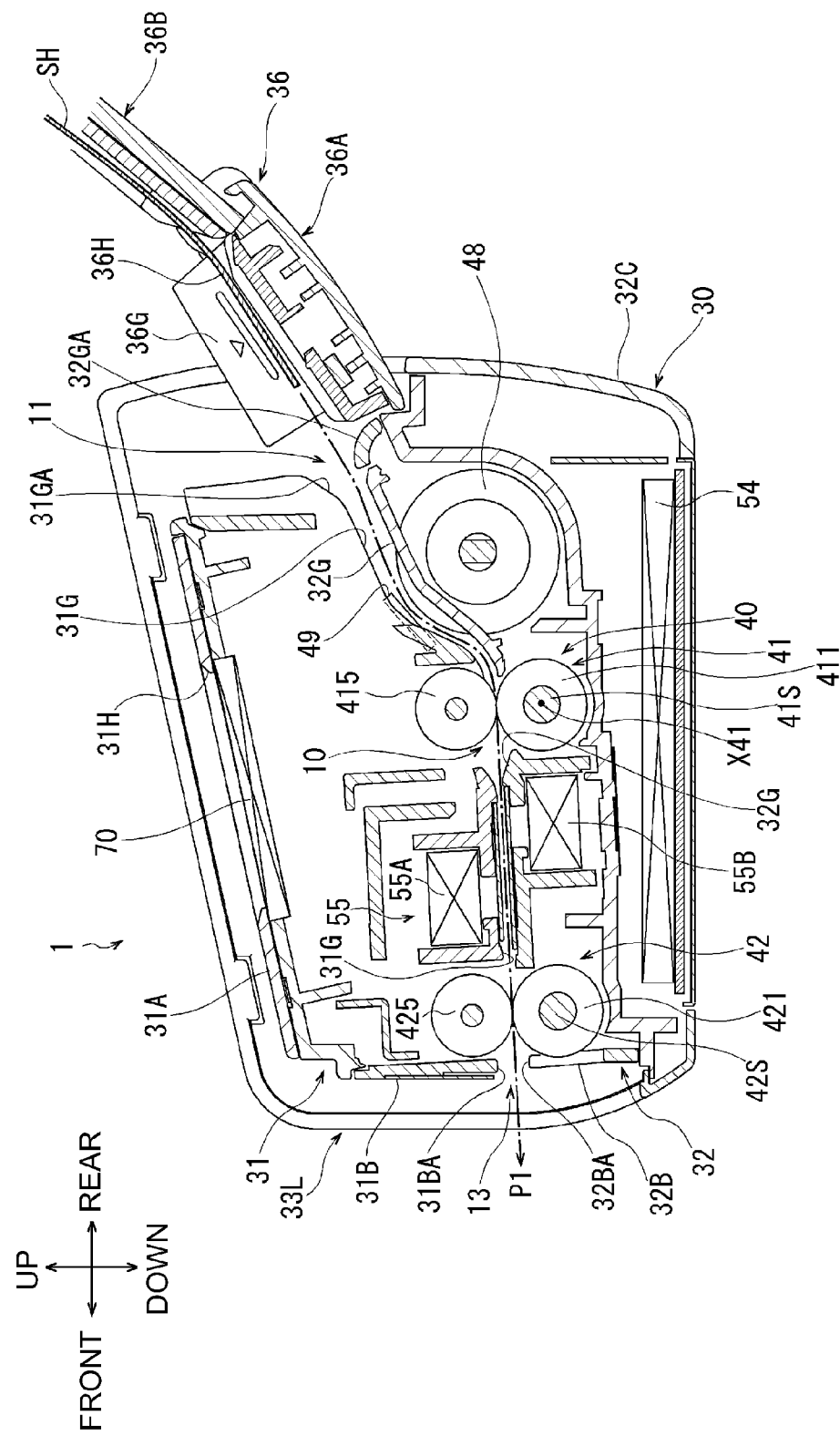
FIG. 5 is a sectional view of the image reading apparatus, taken along the line A-A in FIG. 4.
Figure 6:
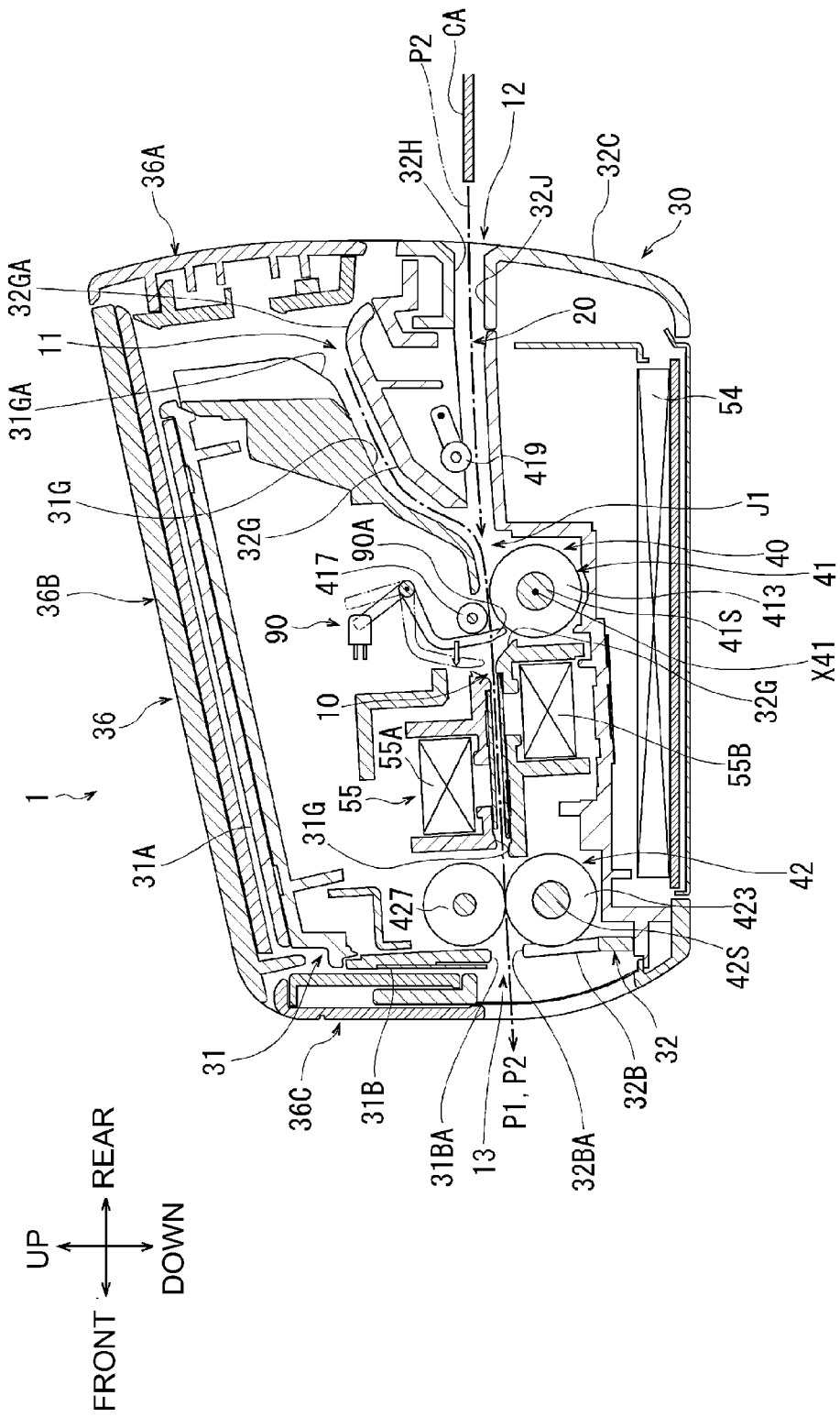
FIG. 6 is a sectional view of the image reading apparatus in which the tray is closed, taken along the line B-B in FIG. 4.
Figure 7:
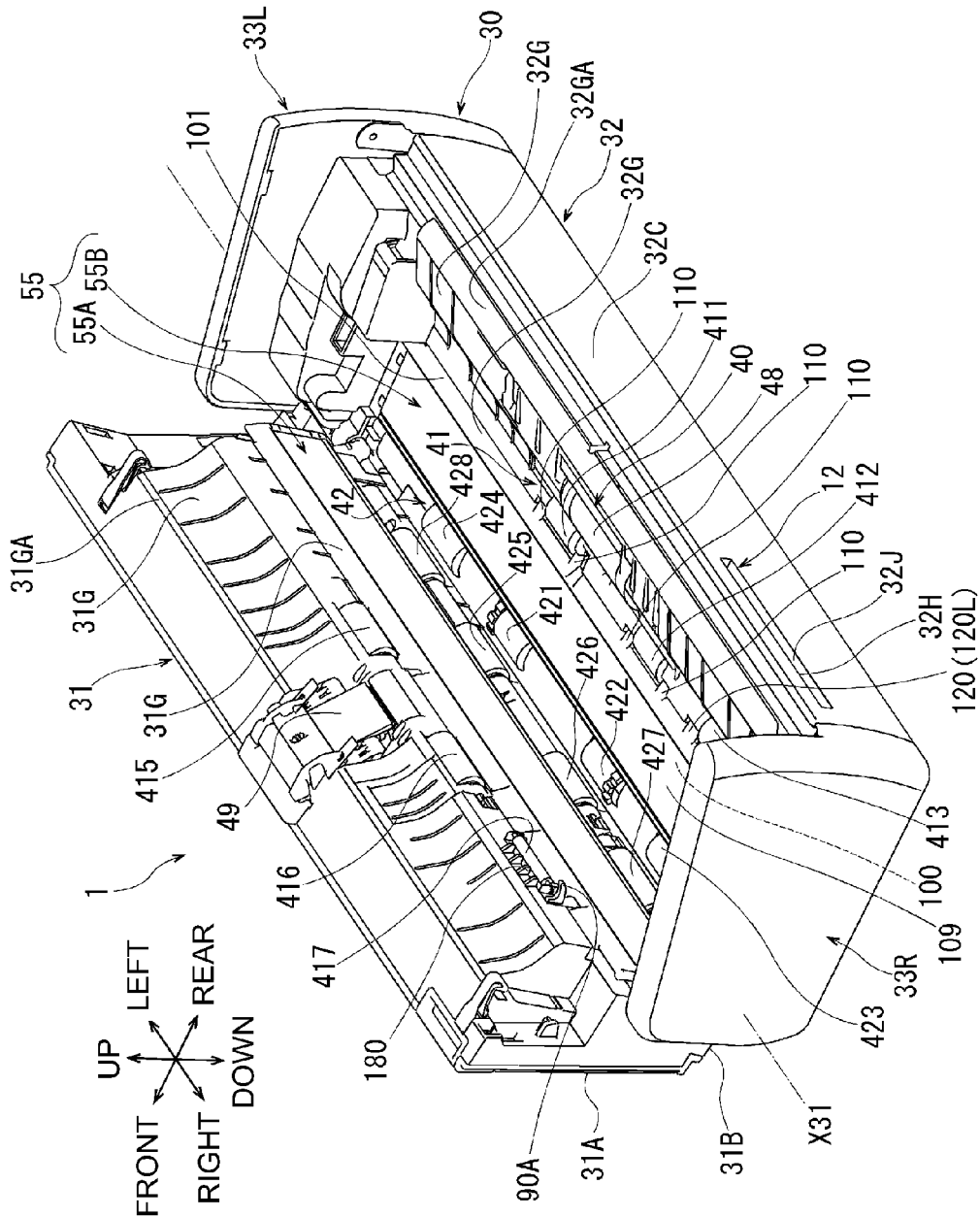
FIG. 7 is a perspective view of the image reading apparatus in which a second housing is pivotally moved.

As illustrated in FIGS. 1 and 5 to 7, the first housing 31 may comprise an upper surface 31A, a front surface 31B, and an upper guide surface 31G. The upper surface 31A may be a flat surface facing upward. The upper surface 31A may be inclined downward from the back toward the front. A touch panel 70 may be provided at the central portion of the upper surface 31A. The front surface 31B may be a flat surface facing the front. The front surface 31B may extend downward in the vertical direction from the front end of the upper surface 31A to a lower end 31BA. As illustrated in FIGS. 5 to 7, the upper guide surface 31G may comprise an inclined portion disposed on a rear portion of the upper guide surface 31G and also may comprise a horizontal portion disposed on a front portion of the upper guide surface 31G. The inclined portion of the upper guide surface 31G may comprise a downward inclination that may extend forward from below the rear end of the upper surface 31A.

The horizontal portion of the upper guide surface 31G may extend forward to the lower end 31BA of the front surface 31B.

As illustrated in FIGS. 1, 2, and 5 to 8, the second housing 32 may comprise a front surface 32B, a lower guide surface 32G, and a rear surface 32C. The front surface 32B may be a flat surface facing forward. The upper end 32BA of the front surface 32B may be located below the lower end 31BA of the front surface 31B with a distance therebetween. The front surface 32B may extend downward in the vertical direction. As illustrated in FIGS. 5 to 7, the lower guide surface 32G may comprise an inclined portion disposed on a rear portion of the lower guide surface 32G and also includes a horizontal portion disposed on a front portion of the lower guide surface 32G. The inclined portion of the lower guide surface 32G may comprise a downward inclination that may extend forward from above the upper end of the rear surface 32C along the inclination portion of the upper guide surface 31G. The horizontal portion of the lower guide surface 32G extends forward to the upper end 32BA of the front surface 32B. The rear surface 32C may be a flat surface facing the back. The rear surface 32C may extend downward from its upper end to its lower end in a vertical direction.

As illustrated in FIGS. 2 and 6 to 8, the second housing 32 may comprise a lower card guide surface 32J and an upper card guide surface 32H. The lower card guide surface 32J may extend horizontally and rearward from the right end of the horizontal portion of the lower guide surface 32G to the rear surface 32C. The upper card guide surface 32H may be disposed above the lower card guide surface 32J with a distance therebetween. The upper card guide surface 32H may extend horizontally and rearward in parallel to the lower card guide surface 32J from right end of the horizontal portion of the upper guide surface 31G to the rear surface 32C. The position of the upper card guide surface 32H may be the same as the position of the horizontal portion of the upper guide surface 31G in the up-down direction.

Figure 4:
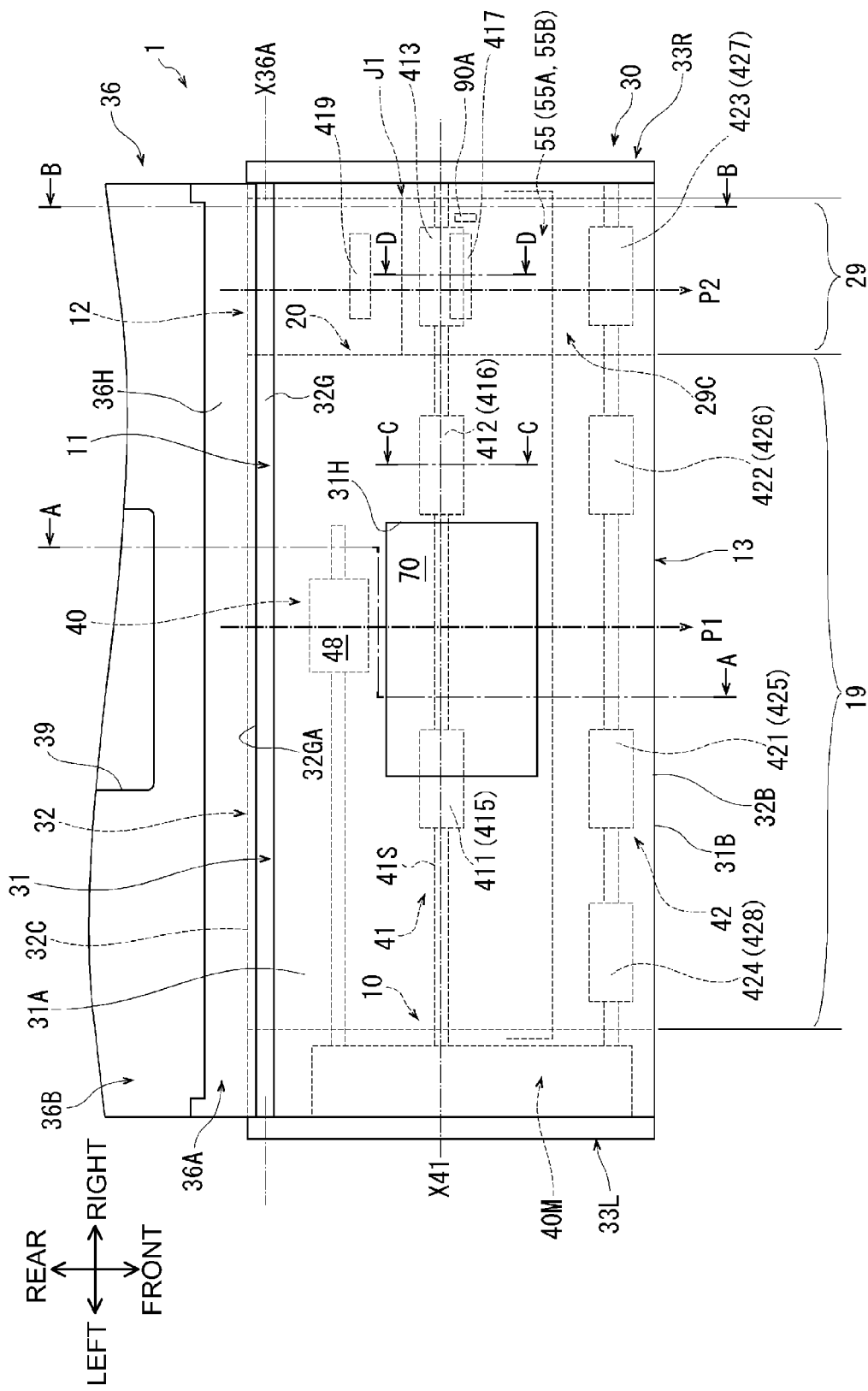
FIG. 4 is a diagrammatic top view of the image reading apparatus in which the tray is open.
Figure 8:
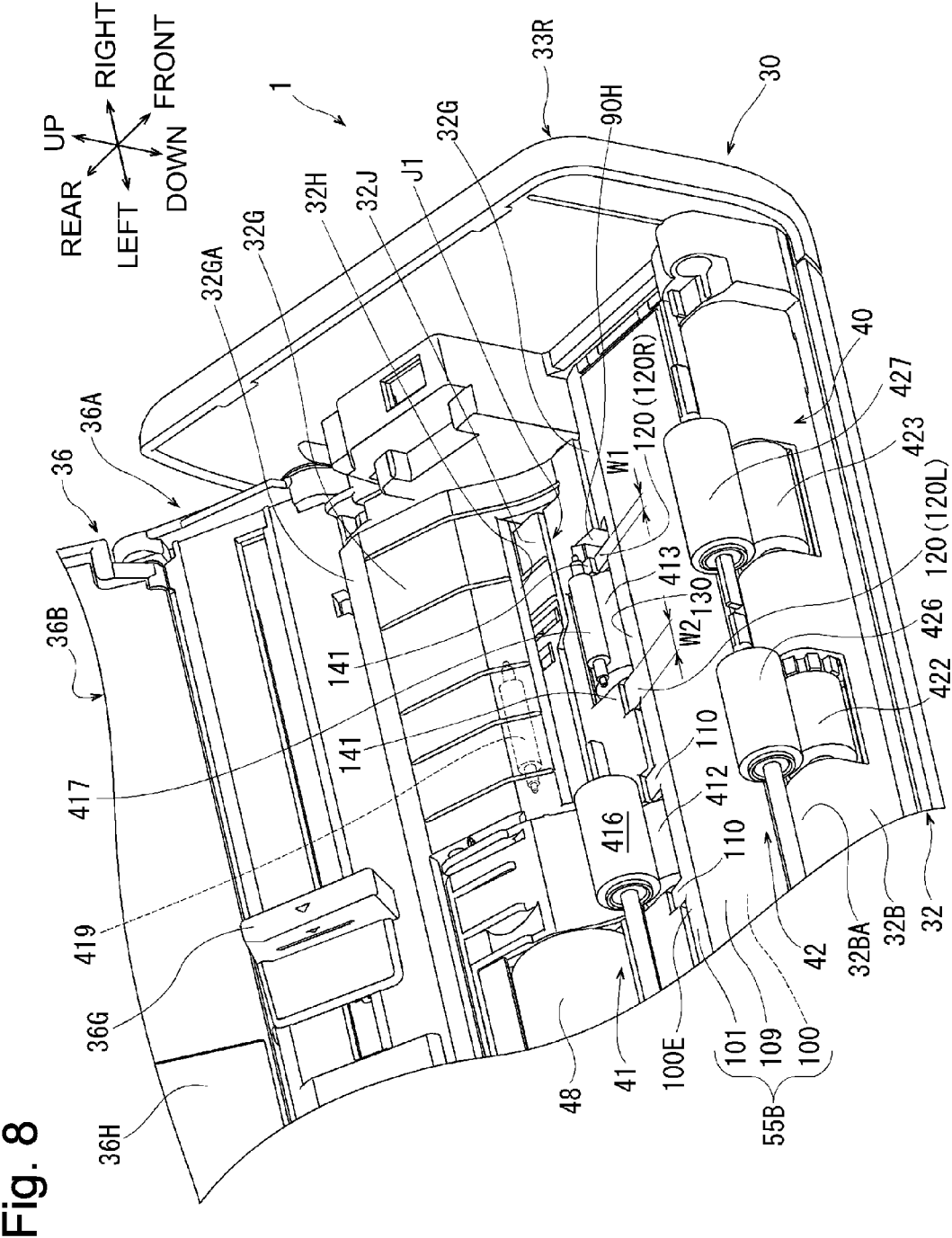
FIG. 8 is a perspective view of the image reading apparatus in which a first driven roller and a second driven roller are left but with a second cover is removed.

The upper guide surface 31G, lower guide surface 32G, upper card guide surface 32H, and lower card guide surface 32J may not be limited to a smooth flat surface, but may be constituted by, for example, tips of ribs or protrusions As illustrated in FIGS. 4, 6, and 8, a junction J1 may be disposed at a position where the lower card guide surface 32J extends to the right end in FIG. 6, e.g., the rear end, of the horizontal portion of the lower guide surface 32G.

As illustrated in FIGS. 1 and 4 to 6, the housing 30 may define a first introduction opening 11 and the discharge opening 13. A medium (a sheet SH, for example) may be inserted into the first introduction opening 11. The sheets SH may be a paper, an overhead projector (OHP) sheet, and the like. A wide-width sheets SH may be a letter size paper, A4-size paper, and the like. A narrow-width sheets SH may be a postcard and the like. Business cards and other types of cards with a narrow width may be other samples of the sheets SH if they may be thin and deformable to be guided along the upper guide surface 31G and lower guide surface 32G.

As illustrated in FIG. 5, the first introduction opening 11 may be defined between the first housing 31 and the second housing 32. The first introduction opening 11 may be also defined by a gap or space between the rear end 31GA of the upper guide surface 31G and the rear end 32GA of the lower guide surface 32G. As illustrated in FIG. 1, the first introduction opening 11 may extend in the left-right direction from a portion near the first side wall 33R on the right side to a portion near the second side wall 33L on the left side.

The length of the first introduction opening 11 in the left-right direction may be longer than the width of the sheet SH.

As illustrated in FIGS. 1 and 5, the sheet SH may be discharged from the discharge opening 13. The discharge opening 13 may be defined between the first housing 31 and the second housing 32. For example, the discharge opening 13 may be also defined by a gap or space between the lower end 31BA of the front surface 31B and the upper end 32BA of the front surface 32B. The discharge opening 13 may extend in the left-right direction from a portion near the first side wall 33R on the right side to a portion near the second side wall 33L on the left side. The length of the discharge opening 13 in the left-right direction may be longer than the width of the sheet SH.

As illustrated in FIGS. 4 to 6, the image reading apparatus 1 may comprise a first guide portion 10. The first guide portion 10 may comprise the upper guide surface 31G of the first housing 31 and the 32G of the second housing 32. The first guide portion 10 may define a first conveyance path P1 between the upper guide surface 31G of the first housing 31 and the 32G, as illustrated in FIGS. 4 to 6. The first guide portion 10 may be configured to guide the sheet SH along the first conveyance path P1 from the first introduction opening 11 to the discharge opening.

In this embodiment, the conveying direction, along which the first conveyance path P1 may extend, may be a direction from the rear toward the front. The upstream of the conveying direction may be on the same side as the first introduction opening 11, the downstream of the conveying direction is on the same side as the discharge opening 13. The width direction, which may be orthogonal to the conveying direction, may be the left-right direction. The height direction, which may be orthogonal to the width direction and the conveying direction, may be the vertical direction. One side in the height direction may be the lower side, and the other side in the height direction may be the upper side. One side of the first conveyance path P1 in the height direction may be the same side as the lower guide surface 32G in the first guide portion 10, and the other side of the first conveyance path P1 in the height direction may be the same side as the upper guide surface 31G in the first guide portion 10.

As illustrated in FIGS. 5 and 6, the first guide portion 10 may be inclined forward and downward from the first introduction opening 11. The first guide portion 10 may include a bent portion at the center of the housing 30 in the front-rear direction. The orientation of the first guide portion 10 may be changed toward the front at the bent portion. The first guide portion 10 extends horizontally from the bent portion to the discharge opening 13. As illustrated in FIGS. 5 and 6, the bent portion includes a boundary between the inclined portion of the upper guide surface 31G and its horizontal portion and a boundary between the inclined portion of the lower guide surface 32G and its horizontal portion.

As illustrated in FIG. 7, the second housing 32 may support the first housing 31 pivotally about an axis X31 The axis X31 may extend in the left-right direction near located the discharge opening 13. When the first housing 31 may be moved upward away from the second housing 32, the first guide portion 10 is released.

As illustrated in FIGS. 2, 4, 6, and 7, the housing 30 may define a second introduction opening 12. A narrow-width medium (a card CA, for example) may be inserted into the second introduction opening 12. The card CA may be, for example, a business card, an ATM card, a membership card, or a license card. The length of the shorter side of the card CA may be 53.98 mm as specified in, for example, the International Standard ID-1 in the International Organization for Standardization (ISO)/International Electrotechnical Commission (IEC). The length of the longer side of the card CA may be 85.60 mm as specified in, for example, the International Standard ID-1 in the International Organization for Standardization (ISO)/International Electrotechnical Commission (IEC). The card CA may be thicker and more rigid than the sheet SH.

For example, as illustrated in FIGS. 4 and 6, the second introduction opening 12 may be formed in the rear surface 32C of the second housing 32 on the same side as the first side wall 33R. The second introduction opening 12 may penetrate the rear surface 32C. The second introduction opening 12 may extend in the left-right direction. The length of the second introduction opening 12 in the left-right direction may be shorter than the length of the first introduction opening 11 in the left-right direction. The length of the second introduction opening 12 in the left-right direction may be longer than the width of the card CA. The vertical position of the second introduction opening 12 may be the same as the vertical positions of the discharge opening 13 and the horizontal portion of the first guide portion 10. The second introduction opening 12 may be disposed below the first introduction opening 11.

Figure 3:
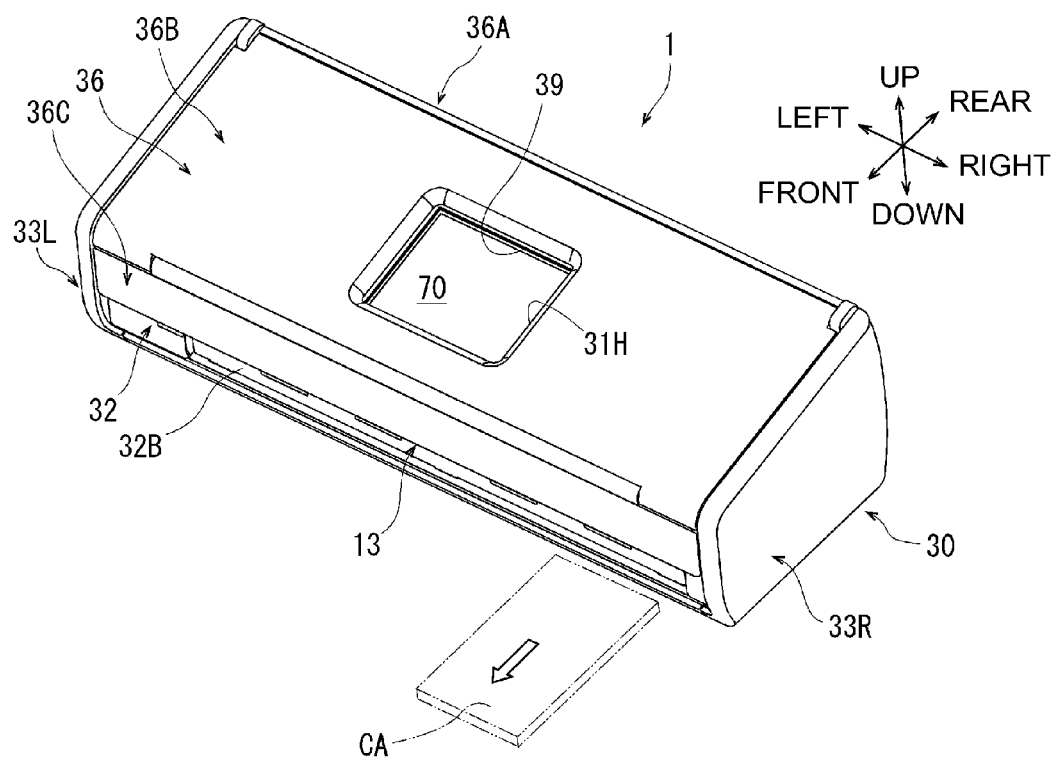
FIG. 3 is a front perspective view of the image reading apparatus in which the tray is closed.

As illustrated in FIGS. 3 and 6, the card CA may be discharged from the right end portion of the discharge opening 13. That is, the discharge opening 13 may be shared to discharge the sheet SH inserted through the first introduction opening 11 and the card CA inserted through the second introduction opening.

As illustrated in FIGS. 4 and 6, the image reading apparatus 1 may comprise a second guide portion 20. The second guide portion 20 may comprise the upper card guide surface 32H and lower card guide surface 32J. The second guide portion 20 may define a path that may be sandwiched vertically between the upper card guide surface 32H and lower card guide surface 32J. The second guide portion 20 may extend forward from the second introduction opening 12 and may join the first guide portion 10 at the junction J1.

The junction J1 may be located in a portion in which the second guide portion 20 may join the first guide portion 10. The junction J1 may be located near the bent portion of the first guide portion 10.

As illustrated in FIG. 4, a card conveyance area 29C may be defined as an area extending from the junction J1 to the discharge opening 13 at the right end of the first guide portion 10. A width of the card conveyance area 29C in the left-right direction may be the same as the width of the second guide portion 20. The second guide portion 20 and the right end portion of the first guide portion 10, at which the card conveyance area 29C is disposed, may define a second conveyance path P2 illustrated in FIGS. 4 and 6. The second conveyance path P2 may extend horizontally from the second introduction opening 12 to the right end portion of the discharge opening 13.

The card CA inserted from the second introduction opening 12 may be guided along the second conveyance path P2 from the second guide portion 20 to the card conveyance area 29C of the first guide portion 10. The card CA may be further guided along the second conveyance path P2 from the card conveyance area 29C to the right end portion of the discharge opening 13.

As illustrated in FIG. 4, the first conveyance path P1 may have a first area 19 and a second area 29. The first area 19 may be located in the left side of the card conveyance area 29C in the first guide portion 10 and may extend from the first introduction opening 11 to the discharge opening 13. The second area 29, which may include the card conveyance area 29C in the first guide portion 10, may be adjacent to the right side of the first area 19 and may extend from the first introduction opening 11 to the discharge opening 13.

Figure 2:
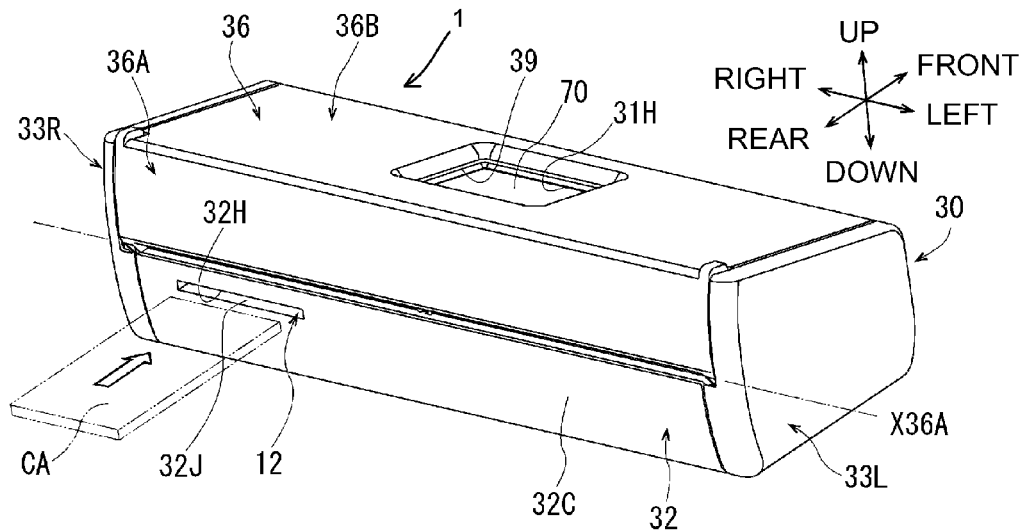
FIG. 2 is a rear perspective view of the image reading apparatus in which the tray is closed.

As illustrated in FIGS. 1 to 3, the tray 36 may comprise a base portion 36A, an intermediate portion 36B, and a tip portion 36C. The base portion 36A may be pivotally supported by the first side wall 33R and second side wall 33L about an axis X36A extending in the left-right direction. The intermediate portion 36B may be connected to an end of the base portion 36A further from the axis X36 A. The tip portion 36C may be connected to an end of the intermediate portion 36 further from the base portion 36A. An operation opening 39 in a rectangular shape may be formed at the center of the intermediate portion 36B.

When the tray 36 is open as illustrated in FIGS. 1, 4, and 5, the base portion 36A, intermediate portion 36B, and tip portion 36C may extend upward and rearward so as to continue to the inclined portion of the lower guide surface 32G. When the tray 36 is open, the first introduction opening 11 may open (e.g., exposed). The position of the tray 36 illustrated in FIGS. 1, 4, and 5 will be referred to as the open position. When the tray 36 is at the open position, the upward surfaces of the base portion 36A, intermediate portion 36B, and tip portion 36C may form a holding surface 36H. When one or a plurality of sheets SH is placed on the tray 36, the holding surface 36H may hold the sheets SH from below.

With the tray 36 is closed as illustrated in FIGS. 2, 3, and 6, the base portion 36A may extend vertically and may be flush with the rear surface 32C of the second housing 32. The intermediate portion 36B may cover the upper surface 31A of the first housing 31 from above. The tip portion 36C may cover the front surface 31B of the first housing 31 from the front side of the front surface 31B. The position of the tray 36 illustrated in FIGS. 2, 3, and 6 will be referred to as the closed position. When the tray 36 is at the closed position, the operation opening 39 may be positioned above the touch panel 70.

As illustrated in FIGS. 1, 5, and 8, the image reading apparatus 1 may comprise a pair of restricting portions 36G. These restricting portions 36G may be spaced apart from each other in the left-right direction. Each restricting portion 36G may be connected to the base portion slidably in the left-right direction. The restricting portion 36G may protrude upward from the holding surface 36H. The restricting portion 36G may be connected to a rack and pinion mechanism (not shown) disposed inside the base portion 36A. The restricting portions 36G may sandwich a sheet SH, which is introduced into the first introduction opening 11 while being held by the holding surface 36H of the tray 36, from the outer sides of the sheet SH in the left-right direction to position the sheet SH in the left-right direction. In this case, the restricting portions 36G may be moved together by the rack and pinion mechanism and position the sheet SH relative to the center of the first introduction opening 11 in the left-right direction.

In FIG. 1, the restricting portions 36G may be spaced apart in the left-right direction as far as they will move. In this state, the restricting portions 36G may position a sheet SH, for example, an A4-sized sheet, relative to the center of the first introduction opening 11 in the left-right direction. This type of A4-sized sheet may be guided by the first guide portion 10 in the first area 19 and second area 29. In FIG. 8, the restricting portion 36G on the right side may be positioned close to the center of the first guide portion 10 in the left-right direction. The restricting portion 36G on the left side may be also positioned close to the center of the first guide portion 10 in the left-right direction. In this state, the restricting portions 36G may position, for example, a sheet SH with a postcard size relative to the center of the first introduction opening 11 in the left-right direction. Although not shown, when the restricting portions 36G are positioned further close to each other from the state in FIG. 8, the restricting portions 36G may position a sheet SH with a business card size relative to the center of the first introduction opening 11 in the left-right direction. This type of business card sized sheet SH may be guided by the first guide portion 10 in the first area 19 without passing through the second area 29.

As illustrated in FIGS. 4 to 6, the image reading apparatus 1 may comprise a circuit board 54, a drive source 40M, a conveyor 40 and a reader 55.

As illustrated in FIGS. 5 and 6, the circuit board 54 may be disposed at the bottom of the second housing 32. The circuit board 54 may comprise a control circuit that includes a processing unit (CPU), a read-only memory (ROM), a random-access memory (RAM), and the like. The circuit board 54 may be powered from a home electric outlet through an AC adapter and a power supply cord. The circuit board 54 may be electrically connected to the drive source 40M, the reader 55, the touch panel 70, and other elements. The circuit board 54 controls the drive source 40M, reader 55, and touch panel 70 and also supplies power to them.

As illustrated in FIG. 4, the drive source 40M may be disposed on the same side as the second side wall 33L (i.e., left side) in the second housing 32. The drive source 40M may comprise a motor (not shown) and transmission gears (not shown). The drive source 40M may generate a drive force while the motor is controlled by the circuit board 54.

As illustrated in FIGS. 4 to 8, the conveyor 40 may comprise a separation roller 48, a separation pad 49, an upstream conveying portion 41, and a downstream conveying portion 42. The reader 55 may comprise a first reader 55A and a second reader 55B. In the first guide portion 10, the separation roller 48, separation pad 49, upstream conveying portion 41, second reader 55B, first reader 55A, and downstream conveying portion 42 may be disposed in this order from the rear toward the front (i.e., from the upstream side to the downstream side in the conveying direction of the sheet SH). These elements will be described below in that order.

As illustrated in FIGS. 4, 5, 7, and 8, the separation roller 48 may be rotatably supported in the second housing 32. An upper portion of the separation roller 48 may be exposed from the inclined portion of the lower guide surface 32G to the first guide portion 10. Since the first guide portion 10 may define the first conveyance path P1, in other words, the upper portion of the separation roller 48 may protrude from the inclined portion of the lower guide surface 32G toward the first conveyance path P1. The separation roller 48 may be disposed in the central portion of the first guide portion 10 in the left-right direction. The central portion may be defined as a range including the center of the first guide portion 10 in the left-right direction (for example, a range closer to the center in the left-right direction than the second area 29 is).

The separation roller 48 may be configured to rotate by the drive source 40M. The drive source 40M may be controlled by the circuit board 54. The separation roller 48 may be configured to rotate while making contact with the sheet SH held by the holding surface 36H of the tray 36, feeding the sheet SH to the first guide portion 10.

As illustrated in FIGS. 5 and 7, the separation pad 49 may be attached to the first housing 31. The separation pad 49 may be exposed to the first guide portion 10 on the upper guide surface 31G. The separation pad 49 may be comprise frictional member (e.g., a rubber, an elastomer, or the like) and may have a plate-like shape. The separation pad 49 may be urged by an urging member (not shown) so as to be pressed against the separation roller 48. Thus, the separation roller 48 and separation pad 49 may be configured to separate sheets SH to be conveyed in the first guide portion 10 one by one while holding the sheets SH therebetween.

As illustrated in FIGS. 4 to 10, the upstream conveying portion 41 may comprise first drive rollers 411 and 412, a second drive roller 413, first driven rollers 415 and 416, and a second driven roller 417.

The first drive rollers 411 and 412 and the second drive roller 413 may be disposed on the same side as the lower guide surface 32G in the first guide portion 10, closer to the first introduction opening 11 than the second reader 55B. The first drive rollers 411 and 412 and the second drive roller 413 may be fixed to an upstream driving shaft 41S. The upstream driving shaft 41S may extend from the drive source 40M to the vicinity of the first side wall 33R in the left-right direction. A drive axis X41 may be a central axis of the upstream driving shaft 41S. The drive axis X41 may extend in the left-right direction between the junction J1 and the second reader 55B. The first drive rollers 411 and 412 and the second drive roller 413 may have the same diameter.

As illustrated in FIG. 4, the second drive roller 413 may be disposed in the second area 29. The first drive rollers 411 and 412 may be disposed in the first area 19. The first drive roller 411 may be disposed to the left of the separation roller 48. The first drive roller 412 may be disposed to the right of the separation roller 48. The first drive rollers 411 and 412 and the second drive roller 413 may be rotationally driven about the drive axis X41 with a driving force of the drive source 40M. The driving force may be transmitted through the upstream driving shaft 41S.

As illustrated in FIGS. 5 and 7 to 9, the first driven rollers 415 and 416 may be disposed on the same side as the upper guide surface 31G in the first guide portion 10. The first driven roller 415 may be disposed above its corresponding first drive roller 411 and faces the first drive roller 411. The first driven roller 416 may be disposed above its corresponding first drive roller 412 and faces the first drive roller 412. The first driven roller 415 may be urged by an urging member (not illustrated) so as to be pressed against the first drive roller 411. The first driven roller 416 may be urged by an urging member (not shown) so as to be pressed against the first drive roller 412. The first drive rollers 411 and 412 and the first driven rollers 415 and 416 may be disposed in the first area 19. The first drive roller 411 and first driven roller 415 may contact with each other and the first drive roller 412 and first driven roller 416 may contact with each other. The first drive rollers 411 and 412 and the first driven rollers 415 and 416 may hold the sheet SH guided by the first guide portion 10 and transmit a conveying force to the sheet SH.

Figure 10:
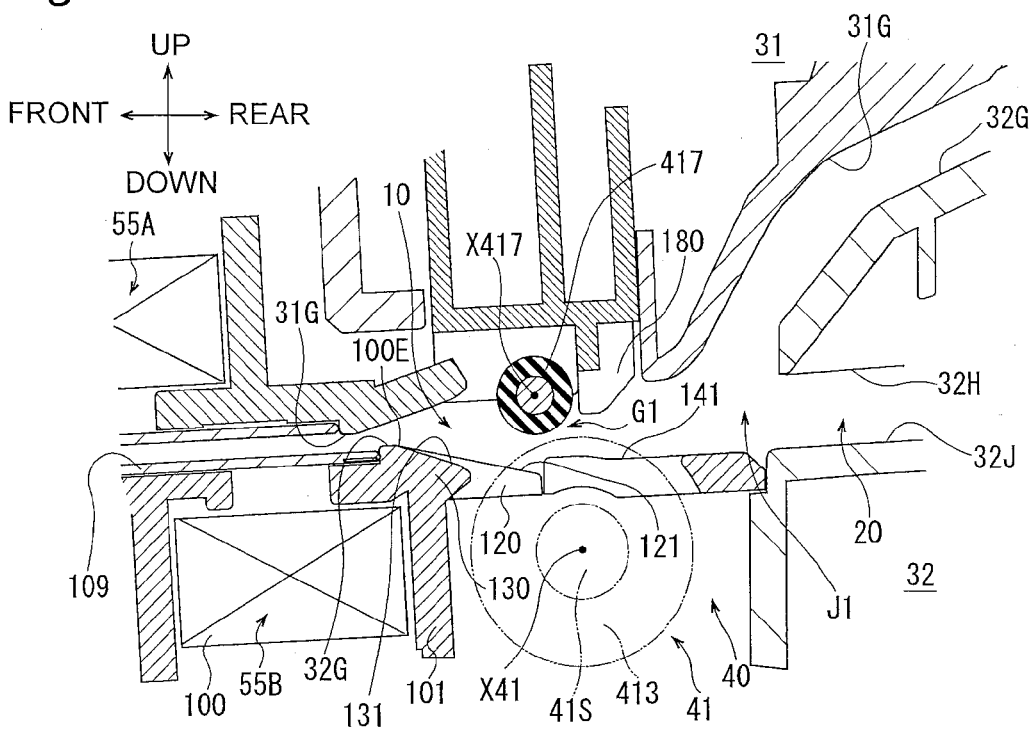
FIG. 10 is a partial cross sectional view taken along line D-D in FIG. 4.
Figure 11:
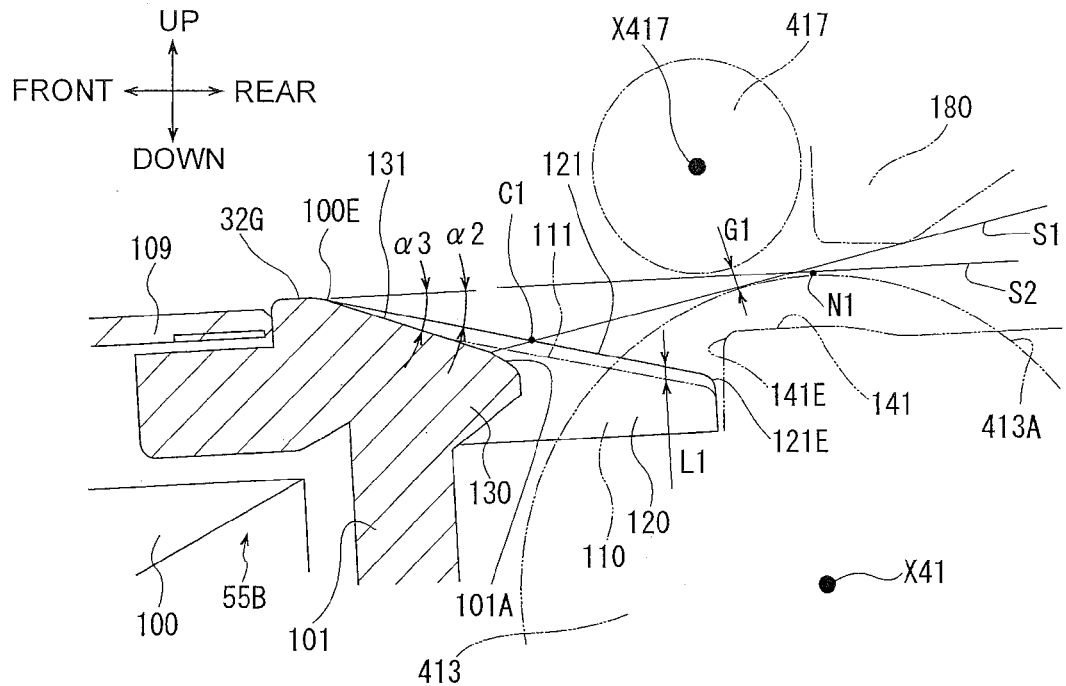
FIG. 11 is a schematic sectional view illustrating a correlation among a first surface, a second surface, a third surface, and a fourth surface.

As illustrated in FIGS. 6 to 8 and 10, the second driven roller 417 may be disposed on the same side as the upper guide surface 31G in the first guide portion 10. The diameter of the second driven roller 417 may be smaller than the diameters of the first driven rollers 415 and 416. As illustrated in FIGS. 10 and 11, the second driven roller 417 may be supported by the first housing 31 rotatably about a second driven axis X417. The second driven axis X417 may extend in the left-right direction. The second driven roller 417 may be disposed above and spaced apart from the second drive roller 413. The second drive roller 413 and second driven roller 417 may be disposed in the second area 29 and may define a gap G1 in the vertical direction therebetween.

The gap G1 may be larger than the thickness of a wide-width sheet SH that is guided by the first guide portion 10 in the first area 19 and second area 29. Thus, the second drive roller 413 and second driven roller 417 do not hold the wide-width sheet SH.

As illustrated in FIGS. 7, 10, and 11, a plurality of protrusions 180 may be formed on the same side as the upper guide surface 31G in the first guide portion 10. The protrusions 180 may be disposed closer to the junction J1 than the second driven roller 417 and may be aligned in the left-right direction. As illustrated in FIGS. 10 and 11, each protrusion 180 may protrude from below the upper guide surface 31G toward the lower guide surface 32G. The downward edge of the protrusion 180 may be inclined downward and forward. The bottom edge of the protrusion 180 may be closer to the second drive roller 413 than the second driven roller X417.

As illustrated in FIGS. 4 and 6, an auxiliary roller 419 may be provided on the same side as the upper card guide surface 32H in the second guide portion 20. The auxiliary roller 419 may urge the card CA introduced from the second introduction opening 12 so that the card CA moves along the lower card guide surface 32J.

As illustrated in FIGS. 4, 6, and 7, a sensor 90 may be provided in the first housing 31. The sensor 90 may be swingably supported by the first housing 31. The lower end 90A of the sensor 90 may extend to the right end of the second drive roller 413. The sensor 90 may be configured to detect a sheet SH and card CA that passes by the second drive roller 413 in the second area 29. A result of detection by the sensor 90 may be transmitted to the circuit board 54 and may be used to, for example, control timings at which the first reader 55A and second reader 55B start reading.

As illustrated in FIGS. 4 to 10, the second reader 55B may be disposed on the same side as the lower guide surface 32G in the first guide portion 10. As illustrated in FIGS. 7 to 10, the second reader 55B may comprise a contact image sensor (CIS) 100, a CIS holder 101, a contact glass 109, and the like.

The CIS 100 may comprise a plurality of read elements aligned in the left-right direction. The CIS 100 may extend in the left-right direction, which may be a main scanning direction of the CIS 100. The CIS holder 101 may extend in the left-right direction. The CIS holder 101 may be made from a resin. The CIS 100 may be embedded in the CIS holder 101. The upper surface of the CIS holder 101 may be part of the lower guide surface 32G. The contact glass 109 may be attached to the upper surface of the CIS holder 101 so as to be exposed to the lower guide surface 32G. The contact glass 109, which may extend in the front-rear direction, may be disposed parallel to the conveying direction of the sheet SH and card CA. The vertical direction perpendicular to the surface of the contact glass 109 may be the height direction.

As illustrated in FIG. 4, the second reader 55B may extend from the vicinity of the first side wall 33R to the vicinity of the second side wall. The CIS 100 of the second reader 55B may be configured to read an image on the lower surface of the sheet SH and card CA guided by the first guide portion 10 through the contact glass 109.

As illustrated in FIGS. 7 to 10, the CIS holder 101 may comprise first protrusions 110, second protrusions 120, and third protrusions 130. The first protrusions 110, second protrusions 120, and third protrusions 130 may be formed at the rear end 100E of the upper surface of the CIS holder 101.

Figure 9:
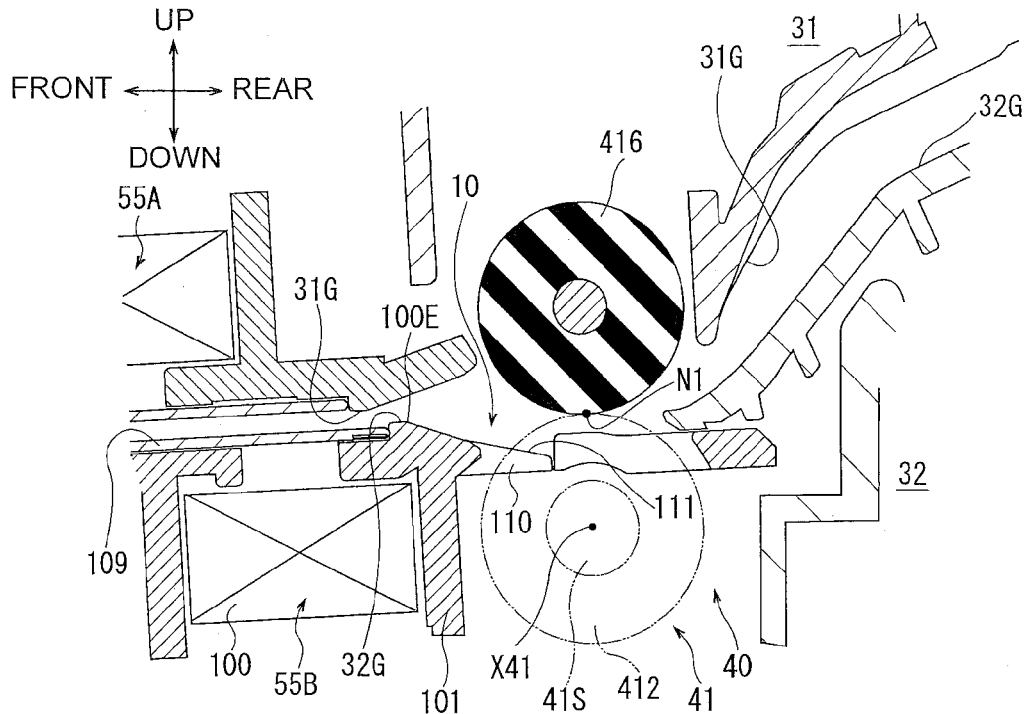
FIG. 9 is a partial cross sectional view taken along line C-C in FIG. 4.

As illustrated in FIGS. 7 to 9, the first protrusions 110 may be disposed on the right side and left side of the first drive roller 411 and on the right side and left side of the first drive roller 412. Each first protrusion 110 may protrude rearward from the rear end 100E of the CIS holder. As illustrated in FIGS. 9 and 11, the first protrusion 110 may comprise a first surface 111 that faces upward. The first surface 111 may be inclined downward and rearward from the rear end.

As illustrated in FIGS. 8 and 10, each second protrusion 120 may extend rearward from the rear end 100E of the CIS holder 10. As illustrated in FIG. 8, a pair of second protrusions 120L and 120R may be formed on the CIS holder 101. The second protrusion 120L may be positioned on the left side of the second drive roller 413. The second protrusion 120R may be disposed on the right side of the second drive roller 413. The length W1 of the second protrusion 120R in the in the left-right direction may be shorter than the length W2 of the second protrusion 120L in the in the left-right direction.

A recess portion 90H may be formed on the right side of the second protrusion 120R. The recess portion 90H may be recessed downward from the lower guide surface 32G. The recess portion 90H may be positioned opposite to the second drive roller 413 in the left-right direction with the second protrusion 120R intervening therebetween. The lower end 90A of the sensor 90 may enter the recess portion 90H. Since the recess portion 90H may be adjacent to the second protrusion 120R, the length W1 of the second protrusion 120R in the in the left-right direction may be shorter than the length W2 of the second protrusion 120L in the left-right direction.

As illustrated in FIG. 11, the second protrusion 120 may comprise a second surface 121 facing upward. The second surface 121 may be inclined downward and rearward from the rear end 100E.

As illustrated in FIG. 11, the second surface 121 of the second protrusion 120 may be positioned above the first surface 111 of the first protrusion 110. A first tangent to the lower end of the protrusion 180 and the outer circumferential surface 413A of the second drive roller 413 will be denoted S1. An intersection at which the first tangent S1 and second surface 121 cross each other will be denoted C1. Then, the second surface 121 may be positioned above the first surface 111 in a range behind the intersection C1. The second surface 121 may be also positioned above the first surface 111 in a range in front of the intersection C1 and behind the rear end 100E.

A nip point between the first drive roller 411 and first driven roller 415 and between the first drive roller 412 and the first driven roller 416 will be denoted N1. A second tangent passing through the nip point N will be denoted S2. The second surface 121 of the second protrusion 120 may be positioned below the second tangent S2.

As illustrated in FIGS. 8 and 10, the third protrusion 130 may be adjacent to the right side of the second protrusion 120L and may be adjacent to the left side of the second protrusion 120R. In other words, the third protrusion 130 may be disposed between the second protrusion 120L and the second protrusion 120R. The third protrusion 130 may extend from the rear end 100E of the CIS holder 101 toward the second drive roller 413 behind the third protrusion 130. A length by which the third protrusion 130 protrudes rearward may be shorter than a length by which the second protrusions 120L and 120R protrude rearward. As illustrated in FIGS. 10 and 11, the third protrusion 130 may comprise a third surface 131 facing upward. The third surface 131 may be inclined downward and rearward from the rear end 100E.

As illustrated in FIG. 11, the third surface 131 of the third protrusion 130 may be inclined downward and rearward at a third inclination angle $\alpha 3$. The second surface 121 of the second protrusion 120 may be inclined downward and rearward at a second inclination angle $\alpha 2$, which is smaller than the third inclination angle $\alpha 3$, so that a distance L1 from the first surface 111 of the first protrusion 110 in the height direction may become smaller toward the back. In other words, the second inclination angle $\alpha 2$ of the second surface 121 may be larger than the inclination angle of the first surface 111.

As illustrated in FIGS. 8 and 10, the first guide portion 10 may comprise a fourth surface 141 facing upward. The fourth surface 141 may be part of the horizontal portion of the lower guide surface 32G. The fourth surface 141 may be disposed on the left side and right side of the second drive roller 413. As illustrated in FIG. 11, the fourth surface 141 may extend from behind the second protrusion 120 toward the second protrusion 120. The rear end 121E of the second surface 121 may be positioned below the front end 141E of the fourth surface 141.

As illustrated in FIGS. 4 to 7, the first reader 55A may be disposed on the same side as the upper guide surface 31G in the first guide portion 10. The first reader 55A may comprise a CIS, a CIS holder, a contact glass, and the like. In the horizontal portion of the upper guide surface 31G, a bottom surface of the contact glass of the first reader 55A may be exposed to the first guide portion 10. As illustrated in FIG. 4, the first reader 55A may extend in the left-right direction from the vicinity of the first side wall 33R on the right side to the vicinity of the second side wall 33L on the left side.

As illustrated in FIGS. 4 to 8, the downstream conveying portion 42 may comprise downstream drive rollers 421, 422, 423, and 424 and also may comprise downstream driven rollers 425, 426, 427, and 428.

The downstream drive rollers 421, 422, 423, and 424 may be disposed on the same side as the lower guide surface 32G in the first guide portion 10 and may be closer to the discharge opening 13 than the first reader 55A. The downstream drive rollers 421, 422, 423, and 424 may be fixed to a downstream drive shaft 42S. The downstream drive shaft 42S may extend from the drive source 40M to the vicinity of the first side wall 33R in the left-right direction. The downstream drive roller 423 may be positioned in the second area 29. The downstream drive rollers 421 and 422 may be positioned in the first area 19. The downstream drive roller 424 may be also positioned in the first area 19 but may be to the left of the downstream drive roller 421. The downstream drive rollers 421, 422, 423, and 424 may be rotated with the driving force of the drive source 40M, the driving force being transmitted through the downstream drive shaft 42S.

The downstream driven rollers 425, 426, 427, and 428 may be disposed on the same side as the upper guide surface 31G in the first guide portion 10. The downstream driven rollers 425, 426, 427, and 428 may be respectively disposed above their corresponding downstream drive rollers 421, 422, 423, and 424 so as to respectively face the downstream drive rollers 421, 422, 423, and 424. The downstream driven rollers 425, 426, 427, and 428 may be each urged by an urging member (not shown) so as to be respectively pressed against the downstream drive rollers 421, 422, 423, and 424. The downstream drive rollers 421, 422, 423, and 424 and downstream driven rollers 425, 426, 427, and 428 may hold a sheet SH guided by the first guide portion 10 and may transmit a conveying force to the sheet SH. The downstream drive roller 423 and downstream driven roller 427 may hold a card CA conveyed in the card conveyance area 29C and transmit a conveying force to the card CA.

As illustrated in FIGS. 1 and 5, the touch panel 70 may be attached to an interior of the upper surface 31A in the first housing 31. The touch panel 70 may be exposed to the outside through a rectangular touch panel opening 31H formed in the upper surface 31A. The touch panel 70 may comprise a liquid crystal display panel, a light source such as a fluorescent lamp or a light-emitting diode (LED), configured to emit light from the back surface of the liquid crystal display panel, and a contact sensing film stuck to the front surface of the liquid crystal display panel.

The touch panel 70 may be configured to display, for example, an operational status of the image reading apparatus 1, e.g., a processing status of an image reading operation, an error status, and the like under control by the circuit board 54. The touch panel 70 may be configured to permit external input. For example, the touch panel 70 may be configured to display, for example, a button to start to read an image, buttons to enter settings, and other various buttons. When a button displayed in the touch panel 70 is touched (e.g., selected) to perform an operation or setting corresponding to the button, the touch panel 70 may transmit a signal in response to the touch operation, to the control board 54.

The image reading apparatus 1 may be configured to read an image on a sheet SH and a card CA as described below. When an image on a sheet SH is read, the tray 36 may be at the open position as illustrated in FIGS. 1 and 5. One or more sheets SH may be placed on the tray 36. When the circuit board 54 receives, for example, a command to read the sheet SH from the touch panel 70, the circuit board 54 may refer to the detection result of a sheet detecting sensor (not shown) to determine whether at least one sheet SH has been held on the holding surface 36H of the tray 36. When at least one sheet SH has been held on the holding surface 36H, the circuit board 54 may start an operation to read an image on the sheet SH.

The circuit board 54 may transmit a command to cause the drive source 40M to generate a driving force. The separation roller 48 may be rotated in response to the transmitted command while holding the sheet SH together with the separation pad 49. The separation roller 48 may introduce the sheet SH on the tray 36 from the first introduction opening 11 and may feed the sheet SH to the first guide portion 10. When a stack of a plurality of sheets SH is about to be conveyed, the sheets SH can be separated one by one due to a frictional force between the separation pad 49 and the sheet SH.

Thereafter, the sheet SH is fed by the separation roller 48 to the first drive rollers 411 and 412 and the first driven rollers 415 and 416 of the upstream conveying portion 41. Then the sheet SH may be conveyed in the first guide portion 10 by the first drive rollers 411 and 412 and the first driven rollers 415 and 416. During the conveyance, the second driven roller 417 may be spaced apart from the second drive roller 413 by the first distance L1, so the right end of the wide-width sheet SH guided by the first guide portion 10 in the first area 19 and second area 29 may not be sandwiched between the second drive roller 413 and the second driven roller 417. Accordingly, the conveying force is not transmitted to the right end of the sheet SH from the second drive roller 413 and second driven roller 417.

Images on both surfaces of the sheet SH conveyed in the first guide portion 10 may be read by the first reader 55A and second reader 55B. After the images on the sheet SH have been read, the sheet SH may be discharged by the downstream drive rollers 421, 422, 423, and 424 and downstream driven rollers 425, 426, 427, and 428 of the downstream conveying portion 42 from the discharge opening 13 to the outside of the housing 30.

When an image on the card CA is read as illustrated in FIGS. 2, 3, and 6, the tray 36 may be at the closed position. The card CA may be inserted into the second introduction opening 12 from the back of the housing 30, as illustrated in FIG. 2. Thereafter, the card CA may pass through the second guide portion 20. The leading end of the card CA may reach the card conveyance area 29. When the circuit board 54 receives, for example, a command to read the card CA from the touch panel 70, the circuit board 54 may refer to the detection result of a card detecting sensor (not shown) to determine whether the card CA has been inserted from the second introduction opening 12, after which the circuit board 54 may start an operation to read an image on the card CA.

The circuit board 54 may be configured to transmit a command to cause the drive source 40M to generate a driving force. The second drive roller 413, second driven roller 417, and auxiliary roller 419 of the upstream conveying portion 41 may convey the card CA inside the second conveyance path P2 in response to the transmitted command so that the card CA passes through the junction J1 and proceeds toward the right end of the discharge opening 13. Then, images on both surfaces of the card CA may be read by the first reader 55A and second reader 55B. After the images on the card CA have been read, the card CA may be discharged by the downstream drive roller 423 and downstream driven roller 427 of the downstream conveying portion 42 from the right end of the discharge opening 13 to the outside of the housing 30, as illustrated in FIG. 3.

In the image reading apparatus 1 in the first embodiment, as illustrated in FIG. 11, the gap G1 may be located between the second drive roller 413 and the second driven roller 417. Even if the top of the right end of a wide-width sheet SH guided by the first guide portion 10 in the first area 19 and second area 29 is about to hang down into the gap G1 in the second area 29, the top may contact with the second surface 121 above the first surface 111, suppressing the top from hanging down. Accordingly, the top of the sheet SH may be unlikely to be caught by a portion of the CIS holder 101, such as, for example, an end surface 101A, the portion facing the second drive roller 413 from the front. As a result, the sheet SH may be unlikely to be skewed or cause a jam. Accordingly, the image reading apparatus 1 in the first embodiment may be stably convey a wide-width sheet SH guided by the first guide portion 10 in the first area 19 and second area 29.

With the image reading apparatus 1, when a wide-width sheet SH is guided by the first guide portion 10 in the first area 19 and second area 29, even if the wide-width sheet SH may hang down due to the gravity while the sheet SH is being conveyed from the protrusions 180 toward the first reader 55A and second reader 55B, the sheet SH may come into contact with the second surface 121, which is above the first surface 111, behind the intersection C1. Accordingly, the top of the sheet SH may be further unlikely to be caught by a portion of the CIS holder 101, such as, for example, the end surface 101A, the portion facing the second drive roller 413 from the front.

In addition, with the image reading apparatus 1, the second surface 121 may be below the second tangent S2. Thus, the wide-width sheet SH, which is conveyed in the first area 19 and second area 29, may not be conveyed above the second drive roller 413, which shares the drive axis X41 with the first drive rollers 411 and 412 and has the same diameter as the first drive rollers 411 and 412. As a result, the image reading apparatus 1 enables the wide-width sheet SH to be further stably conveyed in the first area 19 and second area 29.

With the image reading apparatus 1, when the wide-width sheet SH is guided by the first guide portion 10 in the first area 19 and second area 29, even if the wide-width sheet SH may sag due to a curl of the sheet SH, the top of the sheet SH comes into contact with not only the second surface 121 but also the third surface 131, suppressing the sheet SH from sagging. Since the second surface 121 may be inclined at the second inclination angle α2, which is smaller than the third inclination angle α3, the sheet SH may contact with the third surface 131 at a small angle. Accordingly, the sheet SH may be unlikely to be caught the third surface 131. As a result, the image reading apparatus 1 enables the wide-width sheet SH to be further stably conveyed in the first area 19 and second area 29.

On the fourth surface 141 of the image reading apparatus 1, the wide-width sheet SH may be guided by the left end and right end of the second drive roller 413 and may be transferred to the second surface 121. Since the rear end 121E of the second surface 121 may be positioned below the front end 141E of the fourth surface 141, the sheet SH may not be caught by the rear end 121E of the second surface 121. As a result, the image reading apparatus 1 enables the wide-width sheet SH to be further stably conveyed in the first area 19 and second area 29.

With the image reading apparatus 1, as illustrated in FIG. 8, the length W1, in the left-right direction, of the second protrusion 120R may be shorter than the length W2, in the left-right direction, of the second protrusion 120L. Accordingly, a space in which to form the recess portion 90H and to place the lower end 90A of the sensor 90 may be allocated on the right side of the second protrusion 120R, minimizing the width of the image reading apparatus 1.

Figure 12:
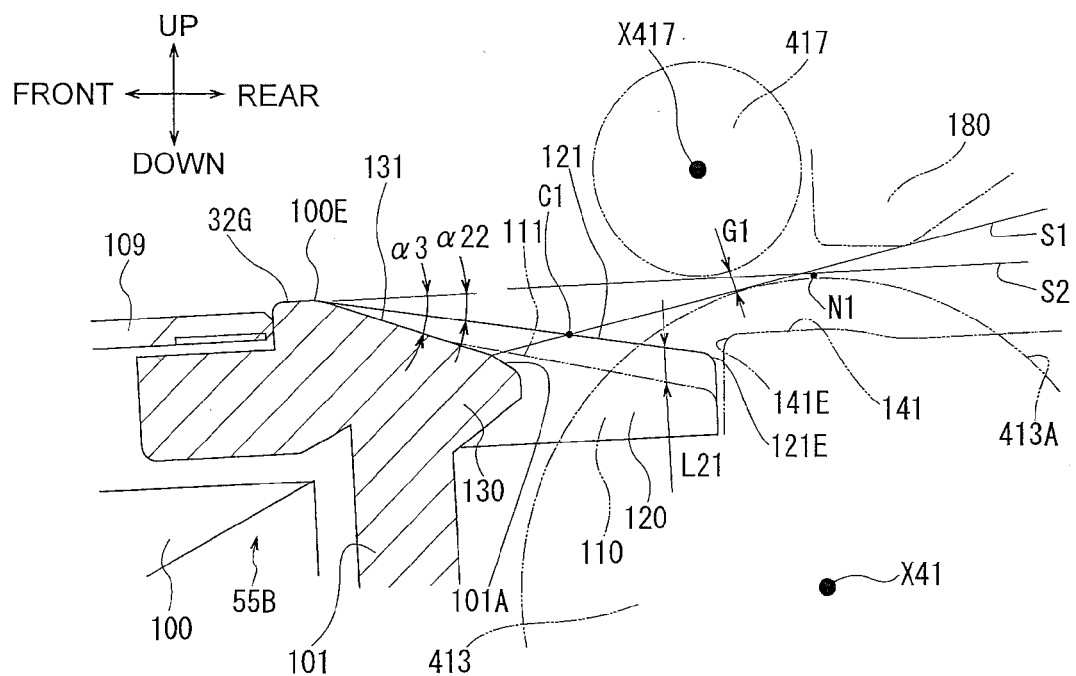
FIG. 12 is a schematic sectional view illustrating another correlation among the first surface, second surface, third surface, and fourth surface.

As illustrated in FIG. 12, an image reading apparatus in a second embodiment differs from the image reading apparatus 1 in the first embodiment in that the inclination angle of the second surface 121 of the second protrusion 120 may be changed. Except this, the structure in the second embodiment may be the same as in the first embodiment. The same elements as in the first embodiment may be assigned the same reference numerals, and repeated descriptions will be omitted or simplified.

In the second embodiment, the second surface 121 may be inclined so that a distance L21 from the first surface 111 in the height direction may become larger toward the back. That is, the second inclination angle α22 of the second surface 121 in the second embodiment may be smaller than the second inclination angle α2 in the first embodiment. In other words, in the second embodiment, the second inclination angle α22 of the second surface 121 may be smaller than the inclination angle of the first surface 111 in the first embodiment. However, the rear end 121E of the second surface 121 in the second embodiment may be positioned below the front end 141E of the fourth surface 141 as in the first embodiment.

In the image reading apparatus, in the second embodiment, the wide-width sheet SH guided by the first guide portion 10 in the first area 19 and second area 29 may contact with the second surface 121 at a smaller angle than in the first embodiment. As a result, the wide-width sheet SH may be further stably conveyed in the first area 19 and second area 29.

While the disclosure has been described in detail with reference to the specific embodiment thereof, this is merely an example, and various changes, arrangements and modifications may be applied therein without departing from the spirit and scope of the disclosure.

What is claimed is:

1. An image reading apparatus configured to read a media, the image reading apparatus comprising:
    a guide portion comprising a first portion that is inclined and a second portion, the guide portion defining a conveyance path, the conveyance path having a first area and a second area, the first area extending in a conveyance direction, the second area extending in the conveyance direction and being adjacent to the first area on a first side in a width direction perpendicular to the conveyance direction, and the second portion being disposed downstream of the first portion in the conveyance direction;
    a reader configured to read an image of the media guided by the guide portion, the reader being disposed on a first side in a height direction with respect to the conveyance path, the height direction being perpendicular to both the conveyance direction and the width direction; and
    a conveying portion provided in the second portion of the guide portion and configured to convey the media guided by the guide portion in the conveyance direction, the conveying portion comprising:
        a first drive roller mounted on the first side in the height direction with respect to the conveyance path, the first drive roller being disposed upstream of the reader in the conveyance direction and disposed in the first area, the first drive roller being configured to rotate about a drive axis extending in the width direction;
        a second drive roller mounted on the first side in the height direction with respect to the conveyance path, the second drive roller being disposed upstream of the reader in the conveyance direction and disposed in the second area, the second drive roller being configured to rotate about the drive axis;
        a first driven roller mounted on a second side in the height direction with respect to the conveyance path and disposed in the first area, the first driven roller contacting the first drive roller; and
        a second driven roller mounted on a second side in the height direction with respect to the conveyance path and disposed in the second area, and an outer surface of the second driven roller facing the second drive roller being spaced apart from an outer surface of the second drive roller facing the second driven roller;
    a first protrusion formed in the reader and disposed in the first area on at least one side or another side of the first drive roller in the width direction, the first protrusion protruding toward upstream in the conveyance direction, the first protrusion comprising a first surface facing the second side in the height direction; and
    a second protrusion formed in the reader and disposed in the second area, which is adjacent to the first area on the first side in the width direction perpendicular to the conveyance direction, on at least one side or another side of the second drive roller in the width direction, the second protrusion not overlapping the first protrusion in the width direction, the second protrusion protruding toward upstream in the conveyance direction, the second protrusion comprising a second surface facing the second side in the height direction, the second surface protruding toward the second side in the height direction more than the first surface of the first protrusion.

2. The image reading apparatus according to claim 1, wherein the guide portion comprises:
   a protruding portion disposed upstream in the conveyance direction with respect to the second driven roller and disposed on the second side in the height direction with respect to the conveyance path, the protruding portion having a surface inclining in a downstream direction to a first point where the incline changes angle, wherein
   the second surface of the second protrusion protrudes toward the second side in the height direction more than the first surface of the first protrusion upstream of an intersection of where a first tangent to the outer surface of the second drive roller intersects the second surface of the second protrusion, the first tangent also intersecting the first point.

3. The image reading apparatus according to claim 1, wherein
   the second surface of the second protrusion is disposed further from the second side in the height direction than a second tangent, the second tangent being tangent to the a nip point between the first drive roller and the first driven roller.

4. The image reading apparatus according to claim 1, further comprising
   a third protrusion adjacent to the second protrusion in the width direction and protruding from downstream of the second drive roller in the conveyance direction toward the second drive roller, the third protrusion comprising a third surface facing the second side in the height direction, the third surface being inclined with a first inclination angle away from the second side in the height direction as the third surface extends upstream.

5. The image reading apparatus according to claim 4, wherein the second surface of the second protrusion is inclined with a second inclination angle away from the second side in the height direction, second inclination angle being less than the first inclination angle.

6. The image reading apparatus according to claim 1, wherein the second surface of the second protrusion approaches the first surface of the first protrusion in the height direction as the second surface extends upstream in the conveyance direction.

7. The image reading apparatus according to claim 1, wherein
   the second surface of the second protrusion is inclined to be further apart from the first surface of the first protrusion in the height direction as the second surface of the second protrusion extends toward upstream in the conveyance direction.

8. The image reading apparatus according to claim 1, wherein
   the guide portion further comprises a fourth surface facing the second side in the height direction, the fourth surface being disposed on one side of the second drive roller in the width direction and extending from upstream of the second protrusion in the conveyance direction toward the second protrusion, and wherein
   an upstream tip of the second surface of the second protrusion in the conveyance direction is disposed further from the second side in the height direction than a downstream tip of the fourth surface of the guide portion in the conveyance direction.

9. The image reading apparatus according to claim 1, further comprising:
   an additional protrusion, and
   a sensor configured to detect the media passing the second drive roller, wherein
   the second protrusion is disposed on one side of the second drive roller in the width direction, wherein
   the additional protrusion is disposed on the other side of the second drive roller in the width direction, wherein
   a tip of the sensor is disposed in a position in the width direction with respect to the second drive roller such that one of the second protrusion and the additional protrusion is between the tip of the sensor and the second drive roller, and wherein
   the one of the second and additional protrusions that is between the tip of the sensor and the second drive roller is narrower in the width direction than the other of the second and additional protrusions.

10. An image reading apparatus configured to read a media, the image reading apparatus comprising:
    a guide portion comprising a first portion that is inclined and a second portion, the guide portion defining a conveyance path, the conveyance path having a left area and a right area, the left area extending in a conveyance direction, the right area extending in the conveyance direction and being adjacent to the left area in a width direction perpendicular to the conveyance direction, and the second portion being disposed downstream of the first portion in the conveyance direction;
    a reader configured to read an image of the media guided by the guide portion, the reader being disposed below the conveyance path in a height direction, the height direction being perpendicular to both the conveyance direction and the width direction; and
    a conveying portion provided in the second portion of the guide portion and configured to convey the media guided by the guide portion in the conveyance direction, the conveying portion comprising:
       a left drive roller being mounted below the conveyance path in the height direction, the left drive roller being disposed upstream of the reader in the conveyance direction, the left drive roller being disposed in the left area, and the left drive roller being configured to rotate about a drive axis extending in the width direction;
       a right drive roller mounted below the conveyance path in the height direction, the right drive roller being disposed upstream of the reader in the conveyance direction, the right drive roller being disposed in the right area, and the right drive roller being configured to rotate about the drive axis;
       a left driven roller mounted above the conveyance path in the height direction, the left driven roller being disposed in the left area, and the left driven roller contacting the left drive roller in the height direction; and
       a right driven roller mounted above the conveyance path in the height direction, the right driven roller being disposed in the right area, and an outer surface of the right driven roller facing the right drive roller being spaced apart from an outer surface of the right drive roller facing the right driven roller;
       a first protrusion disposed in the left area on at least one side or another side of the left drive roller in the width direction, the first protrusion comprising a first surface facing upward in the height direction; and a second protrusion disposed in the right area, which is adjacent to the left area in the width direction perpendicular to the conveyance direction, on at least one side or another side of the right drive roller in the width direction, the second protrusion not overlapping the first protrusion in the width direction, the second protrusion comprising a second surface facing upward in the height direction, the second surface protruding toward upward in the height direction more than the first surface of the first protrusion.

11. The image reading apparatus according to claim 10, wherein the guide portion comprises:
a protruding portion disposed upstream in the conveyance direction with respect to the right driven roller and disposed above the conveyance path, the protruding portion having a surface inclining in a downstream direction to a first point where the incline changes angle, wherein
the second surface of the second protrusion protrudes toward upward in the height direction more than the first surface of the first protrusion upstream of an intersection of where a first tangent to the outer surface of the right drive roller intersects the second surface of the second protrusion, the first tangent also intersecting the first point.

12. The image reading apparatus according to claim 10, wherein
the second surface of the second protrusion is disposed below a second tangent, the second tangent being tangent to the a nip point between the left drive roller and the left driven roller.

13. The image reading apparatus according to claim 10, wherein the second surface of the second protrusion approaches the first surface of the first protrusion in the height direction as the second surface extends upstream in the conveyance direction.

14. The image reading apparatus according to claim 10, further comprising:
an additional protrusion, and
a sensor configured to detect the media passing the right drive roller, wherein
the second protrusion is disposed on one side of the right drive roller in the width direction, wherein
the additional protrusion is disposed on the other side of the right drive roller in the width direction, wherein
a tip of the sensor is disposed in a position in the width direction with respect to the right drive roller such that one of the second protrusion and the additional protrusion is between the tip of the sensor and the right drive roller, and wherein
the one of the second and additional protrusions that is between the tip of the sensor and the second drive roller is narrower in the width direction than the other of the second and additional protrusions.

15. The image reading apparatus according to claim 10, wherein
the first and second protrusions are formed in the reader and protrude toward upstream in the conveyance direction.

* * * * *